United States Patent
Sardo et al.

(10) Patent No.: US 6,763,405 B2
(45) Date of Patent: Jul. 13, 2004

(54) PROCESS FOR INTERFACING A MICROPROCESSOR WITH A PACKET BASED DEVICE AND RESPECTIVE SYSTEM

(75) Inventors: Michele Sardo, Florida (IT); Rosario Miritello, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 229 days.

(21) Appl. No.: 09/968,686

(22) Filed: Oct. 1, 2001

(65) Prior Publication Data

US 2002/0060936 A1 May 23, 2002

(30) Foreign Application Priority Data

Oct. 6, 2000  (EP) ............................................ 00830657

(51) Int. Cl.[7] .............................................. G06F 13/00
(52) U.S. Cl. ............................ 710/57; 710/15; 710/52; 710/53; 710/54; 710/55; 710/56; 710/72
(58) Field of Search .............................. 710/52, 53, 54, 710/55, 56, 57, 15, 72

(56) References Cited

U.S. PATENT DOCUMENTS

| | | |
|---|---|---|
| 5,084,841 A | 1/1992 | Williams et al. |
| 5,507,005 A * | 4/1996 | Kojima et al. .............. 710/52 |
| 5,745,707 A * | 4/1998 | Takahashi .................. 710/110 |
| 5,859,980 A | 1/1999 | Kalkunte |
| 6,223,266 B1 * | 4/2001 | Sartore ...................... 711/170 |
| 6,324,595 B1 * | 11/2001 | Tsai et al. .................... 710/15 |
| 6,434,645 B1 * | 8/2002 | Parvin et al. ................ 710/72 |

FOREIGN PATENT DOCUMENTS

WO  WO 94/02900  2/1994

OTHER PUBLICATIONS

European Search Report from priority European patent application No. 00830657, filed Oct. 6, 2000.

* cited by examiner

Primary Examiner—Jeffrey Gaffin
Assistant Examiner—Mohammad O. Farooq
(74) Attorney, Agent, or Firm—Lisa K. Jorgenson; Allen, Dyer, Doppelt, Milbrath & Gilchrist, P.A.

(57) ABSTRACT

In order to enable interfacing of a microprocessor (1) with a peripheral (3) consisting of a device operating according to high-speed communication specifications (for example, IEEE 1394), it is envisaged that the interface (4) should contain a dedicated memory (40) designed to smooth the delays in communication between the main memory (2) and the peripheral (3). The memory (40) has a trigger (10) that is programmable via software to start a communication when a fraction of the memory (40) or the entire memory (40) is full. When a multiple packet starts to be transferred, a signal is generated to alert the microprocessor (1) of the fact that a transfer is almost completed.

24 Claims, 1 Drawing Sheet

PROCESS FOR INTERFACING A MICROPROCESSOR WITH A PACKET BASED DEVICE AND RESPECTIVE SYSTEM

FIELD OF THE INVENTION

The present invention relates to the interfacing of a microprocessor with a device operating according to packet-based communication criteria.

The invention has been developed paying particular attention to its possible application to the interfacing of a microprocessor with a Link Layer 1394 device, namely a device operating according to the high-speed communication specifications defined in the IEEE 1394 standard.

DESCRIPTION OF THE PRIOR ART

When a microprocessor is to be connected to a device with high-speed data transmission characteristics (for example, a peripheral unit for real-time audio/video applications), it is current practice to resort to a packet-based communication mechanism.

The packets are transmitted in a synchronous way with a clock signal with the aim of maximizing transmission throughput to the peripheral, which operates according to a packet protocol.

There may, however, arise situations (for example, a memory-access stall) such as to render momentarily unavailable the packet to be transmitted. This results in a de-assertion of the corresponding validation signal, with a consequent transmission delay.

Prior documents, such as U.S. Pat. No. 5,842,027, tackle the problem of interfacing with USB devices. Other documents, such as U.S. Pat. No. 5,483,656, U.S. Pat. No. 5,752,046 and U.S. Pat. No. 6,061,746 tackle more in general the problem of "power management" in a context which, to a certain extent, is akin to that of the present invention. However, none of the above-cited documents deals in a specific way with the problem underlying the present invention.

OBJECT AND SUMMARY OF THE PRESENT INVENTION

The object of the present invention is, then, to achieve interfacing of a microprocessor with one or more high-speed peripherals operating according to a packet protocol in such a way as to maximize transmission throughput and speed in communication.

In accordance with the present invention, the above object is achieved thanks to a process having the characteristics specifically called for in the claims which follow.

The invention also relates to the corresponding system.

Basically, the solution according to the invention aims at maximizing throughput by minimizing (in actual fact, eliminating) possible gaps or discontinuities that may occur both in data transmission and in data reception within data packets and between sets of successive data packets In the currently preferred embodiment, the solution according to the invention envisages the creation of an interface containing a dedicated memory, whilst the packets are transmitted on the basis of packet size. The dedicated memory "smooths" the delays in the communication between the main memory and the interfacing block proper (for example, a Link Layer Interface (LLI) operating in compliance with the IEEE 1394 standard).

Preferably, this memory has a software-programmable trigger which makes it possible to initiate a communication according to the level of filling of the memory, i.e., when a fraction of the memory or the entire memory is full/empty. In addition, when a multiple packet is being transferred, a signal is used for alerting the microprocessor of the fact that a transfer is nearly complete.

In a particularly preferred embodiment, the solution according to the invention envisages joint recourse to:

a minimization function for minimizing delays during packet transmission, the said function being implemented by using a dedicated internal memory (preferably organized as a FIFO memory), with recourse to a programmable (via software) signal indicating the state of the internal memory;

read-only "shadow" registers containing the current address to be transferred; in this way, the registers that are to be written for the subsequent transfer can be updated before the transfer in progress is through; and an interrupt signal indicating that the transfer is nearly complete, this interrupt can be generated before the transfer is completed, and this enables the next transfer to be programmed before the current transfer is through.

BRIEF DESCRIPTION OF THE ANNEXED DRAWINGS

The invention will now be described, purely by way of non-limiting example, with reference to the annexed drawings, in which.

DETAILED DESCRIPTION OF AN EMBODIMENT OF THE INVENTION

Figure 1:
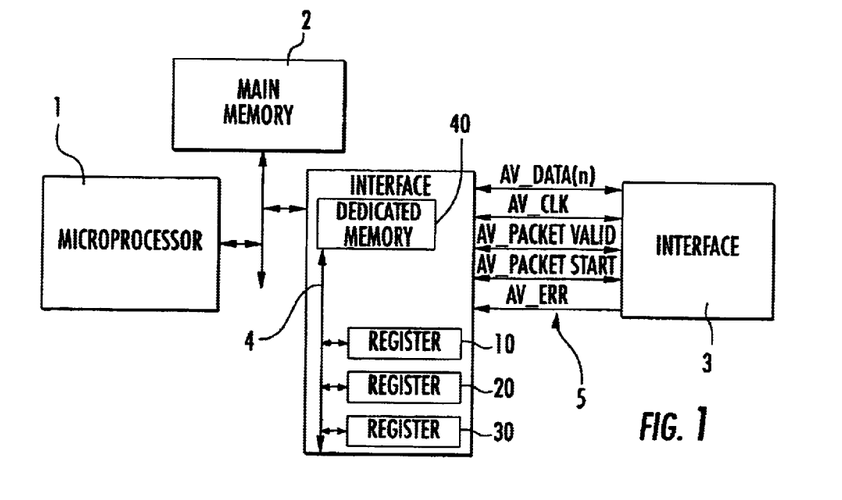
FIG. 1 illustrates, in the form of a block diagram, the typical scenario of application of the invention.

In the block diagram of FIG. 1, the reference number 1 designates a microprocessor to which a main memory 2 is associated.

The microprocessor 1 is intended to be interfaced with a device consisting of a peripheral 3 (of any known type) according to a packet-based protocol.

Interfacing is via a peripheral interface 4 preferably organized as a Link Layer Interface (LLI) operating in conformance with the IEEE 1394 standard.

This is done in general according to criteria in themselves known, which therefore do not need to be recalled in detail herein.

In general, communications between the microprocessor 1 and the peripheral 3 take place, isochronously, on an n-bit parallel channel or port, designated, as a whole, by 5.

In the embodiment herein illustrated (which, we recall, is purely an example) it is assumed that the following five signals transit on the channel 5:

av_data (n input/output bits): audio/video application data av_clk (one output bit): audio/video interface clock av_packet_valid (one input/output bit): indicates that the av_data signal is valid av_packet_start (one input/output bit): sync signal for packet start av_err (one input bit): indicates that an error is present in the packet.

Transmission of information is based on packets the size of which may be defined by the user.

Figure 2:
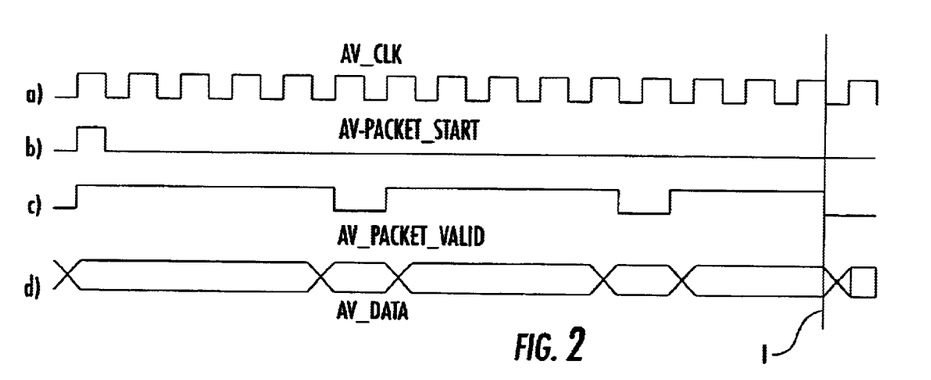
FIG. 2 presents four superimposed timing diagrams, designated as a, b, c, and d, which indicate patterns in time of some signals that may be generated in the framework of a system according to the invention.

The above operating modalities emerge even more clearly from the timing diagrams of FIG. 2, which represent typical patterns of the av_clk signal (timing diagram a), av_packet_start signal (timing diagram b), av_packet_valid signal (timing diagram c), and av_data signal (timing diagram d). The instant 1 indicates the end of a packet in all four timing diagrams.

The packets are therefore sent in a synchronous way with respect to the av_clk signal.

Consequently, situations may arise (for example, a stall of the access to the memory 2) in which the packet to be sent is momentarily not available, so that the av_packet_valid signal is de-asserted, with consequent delay in communication.

In order to prevent "gaps" in transmission in the framework of a packet, the solution according to the invention envisages that the interface 4 will have, associated to it and preferably comprised therein, a dedicated memory 40, the function of which is to regularize the delays of the type described above, eliminating their possible negative effects on the communication between the main memory 2 and the interface 3.

The dedicated memory 40 is preferably arranged in the form of a FIFO memory and is preferably configured in such a way as to generate two filling-level signals that can be sent back to the microprocessor 1.

In particular, the aforesaid filling-level signals (which may also be simply configured as two different states of the same signal) convey the information regarding whether the dedicated memory 40 is full ("fifo full" signal) or empty ("fifo empty" signal).

Before starting transmission, the data are transferred from the main memory 2 to the dedicated memory 40. If the data-transmission speed is high (i.e., operating in high throughput conditions), it is possible to start communication to the peripheral 3 without waiting for the memory 40 to be completely full. Instead, if the data-transfer speed is low (again referring to data transfer between the memory 2 and the dedicated memory 40), it is better to wait for the memory 40 to be completely full before starting transmission to the interface 3.

For this reason, a register 10 may be envisaged (here schematically represented as associated to the interface 4—but it may, of course equally be a register having a different physical location, for instance within the microprocessor 1) which is sensitive to the "fifo full" and "fifo empty" signals described previously (and to the data-transmission speed from the main memory 2 to the dedicated memory 40). All this, with the consequent possibility of beginning data communication starting from the memory 40 to the interface 3 when the memory 40 is completely or only partially full or completely or only partially empty, the degree of filling/emptying that determines the issuing of the corresponding trigger signal being selectively determinable via software through the register 10. The foregoing is performed, operating in a selective way (hence with the consequent possibility of programming from outside) according to the characteristics and performance of the system used.

Another event that is likely to slow down data transmission or reception is illustrated in what follows.

When transfer of data organized in a number of packets is started, usually all the packets are sent contiguously (i.e., without any discontinuity). When a given transfer event is completed, the microprocessor 1 is alerted so that it starts a next transfer event.

This usually occurs by generating, when transmission is through, an interrupt which the CPU of the microprocessor 1 takes a certain number of clock cycles to handle before starting a new transfer event. In this way, a time discontinuity is generated between two consecutive transfer events.

Figure 3:
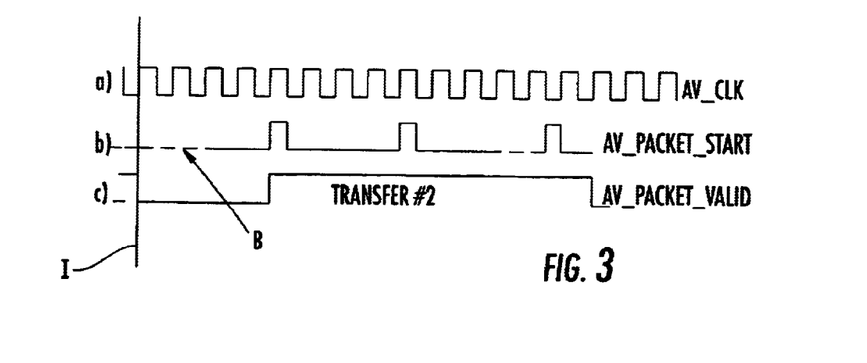
FIG. 3 also includes three superimposed timing diagrams, designated as a, b and c, which represent the patterns of signals generated in the framework of a particularly preferred embodiment of the invention.

This discontinuity is highlighted specifically in FIG. 3, where the two time intervals in which the av_packet_valid signal assumes the "high" logic level indicate two successive data-packet transfer events or operations separated by a time interval indicated by B. This interval corresponds to the number of clock cycles required for the CPU of the microprocessor 1 to be able to start a subsequent transfer event after the first transfer event is through (the instant being indicated, also in this case, by I).

To overcome the above problem, in the preferred embodiment of the present invention, the interface 4 is configured in such a way as to enable generation and sending to the microprocessor 1 of a transfer-almost-through signal (designated "nearly transfer complete") which identifies the fact that the current transfer event is about to be completed.

This solution is adopted by generating two copies of the memory-address location.

This occurs, in particular, when there are available a first register 20, which can be written via software and which contains the starting address of the next data-transfer event starting from the memory 2, and a second (read-only) register 30 containing the current address that is to be accessed by the port 5 during the current transfer event.

Preferably, both of the registers 20 and 30 are located inside the interface 4.

The microprocessor 1 has write access only to the register 20 for programming the transfer.

The register 30 is managed by the interface 4, which uses it to store the current address. The microprocessor 1 has read-only access to the register 30 for debugging purposes.

Upon start of each new transfer event, this second register 30 (which may be defined as a "shadow" register) is a copy of the first register, but, after the first access to the memory, it increases its value, whilst the first register 20 is accessible for writing without this fact affecting the current transfer.

The same criterion of use of shadow registers has already been employed to save the number of packets and the number of words to be transferred. In this way, all the registers that contain information for the next transfer may be written before the current transfer is through.

In this way, the signal indicating the fact that the transfer is about to be completed can be generated with some advance (typically set at a programmable number of words prior to completion of the current transfer event).

In this way, the microprocessor 1 is able to program the next transfer by programming the registers within the interface 40.

When the current transfer event is through, the set of registers regarding the next transfer is immediately transferred into the current set, so that the data transfer can restart immediately without there being any substantial discontinuity.

In addition, since two "motors" are used, one for accessing the memory and the other for the port of the peripheral, thanks to the availability of the "fifo empty" signal (which, as has been seen, may be generated even when the internal memory is only partially empty, hence not necessarily when it is completely empty), access to the memory may start before transfer of the last packet of the preceding block is completed, so eliminating any delay.

Consequently, after a possible slight latency at the start of the first packet of the first transfer, the solution according to the invention enables reduction and virtual elimination of the delays that occur within a packet and between one packet and the next by using the dedicated memory 40 and the corresponding signal indicating the filling state thereof.

In the currently preferred embodiment, the solution according to the invention moreover enables minimization and virtual elimination of the delays between two successive transfers of different sets of packets. This is obtained, on the one hand, by reducing the time for handling of the interrupt by the CPU of the microprocessor 1 via the shadow-register mechanism just described, and, on the other hand, via the generation of the "nearly transfer complete" signal.

Of course, also the latency associated to the first packet of the next transfer benefits from the presence of the dedicated memory 40.

Obviously, without prejudice to the principle of the invention, the details of construction and the embodiments may be widely varied with respect to what is described and illustrated herein, without thereby departing from the scope of the present invention as defined in the attached claims.

What is claimed is:

1. A process for interfacing a microprocessor with a device, the process being based upon transfer of data packets from a main memory to the device via an interface, the process comprising:

associating to said interface a dedicated memory for accumulating the data coming from said main memory in view of their transfer to said device;

generating at least one filling signal which indicates the state of filling of said dedicated memory;

controlling transfer of the data packets from said dedicated memory to said device according to said at least one filling signal;

generating a transfer-almost-through signal indicating that a current transfer event is about to be completed; and sending said transfer-almost-through signal to the microprocessor to enable its configuration in view of a next transfer event which is started upon completion of said current transfer event without any substantial discontinuity.

2. A process according to claim 1, comprising incorporating said dedicated memory in said interface.

3. A process according to claim 1 comprising organizing said dedicated memory as a FIFO memory.

4. A process according to claim 1, comprising activating the transfer of said data to said device in a selectively variable way according to said filling signal, namely according to whether said dedicated memory is completely or partially full and completely or partially empty, respectively.

5. A process according to claim 1, comprising:
providing a first memory element;
recording in said first memory element the start address of said next transfer event;
providing a second memory element;
recording in said second memory element the current memory address being transferred in the framework of said current transfer event; and
upon completion of said current transfer event, transferring the contents of said first memory element into said second memory element, starting said next transfer event in the substantial absence of any discontinuity with respect to said current transfer event.

6. A process according to claim 1, wherein said interface is organized in conformance with the IEEE 1394 standard.

7. An interface system for interfacing a microprocessor with a device, the interface system being able to transfer data packets from a main memory to said device, the interface system comprising:

a dedicated memory for accumulating the data coming from said main memory and being transferred to said device;

said dedicated memory being configured to generate at least one signal indicating the state of filling of the dedicated memory; and an interface for transferring data packets from said dedicated memory to said device according to said at least one filling signal, generating a transfer-almost-through signal indicating that a current transfer event is about to be completed, and sending said transfer-almost-through signal to said microprocessor, said next transfer event being started upon completion of said current transfer event without any substantial discontinuity.

8. A system according to claim 7, wherein said dedicated memory is incorporated in said interface.

9. A system according to claim 7, wherein said dedicated memory is organized as a FIFO memory.

10. A system according to claim 7, comprising a processing element which is selectively programmable for selectively activating transfer of said data to said device based upon whether said dedicated memory is completely or partially full and completely or partially empty, respectively.

11. A system according to claim 7, comprising:
a first memory element for recording the address of start of said next transfer event;
a second memory element for recording the current memory address being transferred in the framework of said current transfer event; the contents of said first memory element being transferable to said second memory element upon completion of said current transfer event, whereby said next transfer event is able to be started in the substantial absence of discontinuities with respect to said current transfer event.

12. A system according to claim 7, wherein said interface is organized according to the IEEE 1394 standard.

13. A method to interface a microprocessor with a device, the microprocessor having a main memory, the method comprising:

providing an interface with an associated dedicated memory to store data being transferred from said main memory to said device;

controlling transfer of the data from said dedicated memory to said device according to at least one status signal which indicates a fullness state of said dedicated memory; and sending a transfer-almost-through signal indicating that a current transfer is about to be completed to the microprocessor before a next transfer event which is started upon completion of said current transfer event.

14. A method according to claim 13, further comprising incorporating said dedicated memory in said interface.

15. A method according to claim 13, wherein said dedicated memory comprises a FIFO memory.

16. A method according to claim 13, further comprising selectively activating the transfer of said data to said device based upon the status signal, the status signal indicating whether said dedicated memory is completely or partially full and completely or partially empty, respectively.

17. A method according to claim 13, further comprising:
providing a first memory element;
recording the start address of the next transfer event in said first memory element;
providing a second memory element;
recording the current memory address of the current transfer event in said second memory element; and
upon completion of said current transfer event, transferring the start address stored in said first memory element into said second memory element, and starting the next transfer event without any substantial discontinuity.

18. A method according to claim 13, wherein said interface meets the IEEE 1394 standard.

19. An interface system for interfacing a microprocessor with a device, the microprocessor having an associated main memory, the system comprising:
a dedicated memory for storing data transferred from said main memory to said device, and generating at least one status signal indicating a fullness state of the dedicated memory; and
an interface for transferring data from said dedicated memory to said device according to said at least one status signal, and sending a transfer-almost-through signal indicating that a current transfer event is about to be completed to said microprocessor, wherein said next transfer event is started upon completion of said current transfer event.

20. A system according to claim 19, wherein said dedicated memory is incorporated in said interface.

21. A system according to claim 19, wherein said dedicated memory comprises a FIFO memory.

22. A system according to claim 19, further comprising a processing element which is selectively programmable for activating transfer of said data to said device based upon the status signal, the status signal respectively indicating whether said dedicated memory is completely or partially full and completely or partially empty.

23. A system according to claim 19, further comprising:
a first memory element for storing a start address of the next transfer event; and
a second memory element for storing the current memory address of the current transfer event;
the start address stored in said first memory element being transferable to said second memory element upon completion of said current transfer event, whereby said next transfer event is started without any substantial discontinuity.

24. A system according to claim 19, wherein said interface conforms to the IEEE 1394 standard.

* * * * *

UNITED STATES PATENT AND TRADEMARK OFFICE
CERTIFICATE OF CORRECTION

| | | |
|---|---|---|
| PATENT NO. | : 6,763,405 B2 | |
| APPLICATION NO. | : 09/968686 | |
| DATED | : July 13, 2004 | |
| INVENTOR(S) | : Sardo et al. | |

It is certified that error appears in the above-identified patent and that said Letters Patent is hereby corrected as shown below:

The title page should be deleted and replaced with the attached title page.

Columns 1 through 8 should be deleted and replaced with the attached columns 1 through 8.

Signed and Sealed this

Twentieth Day of June, 2006

JON W. DUDAS
*Director of the United States Patent and Trademark Office*

(12) United States Patent
Sardo et al.

(10) Patent No.: US 6,763,405 B2
(45) Date of Patent: Jul. 13, 2004

(54) PROCESS FOR INTERFACING A MICROPROCESSOR WITH A PACKET BASED DEVICE AND RESPECTIVE SYSTEM

(75) Inventors: Michele Sardo, Florida (IT); Rosario Miritello, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 229 days.

(21) Appl. No.: 09/968,686

(22) Filed: Oct. 1, 2001

(65) Prior Publication Data

US 2002/0060936 A1 May 23, 2002

(30) Foreign Application Priority Data

Oct. 6, 2000 (EP) .............................................. 00830657

(51) Int. Cl.$^7$ .............................................. G06F 13/00
(52) U.S. Cl. ......................... 710/57; 710/15; 710/52; 710/53; 710/54; 710/55; 710/56; 710/72
(58) Field of Search ............................... 710/52, 53, 54, 710/55, 56, 57, 15, 72

(56) References Cited

U.S. PATENT DOCUMENTS

| | | | |
|---|---|---|---|
| 5,084,841 A | | 1/1992 | Williams et al. |
| 5,507,005 A | * | 4/1996 | Kojima et al. ................. 710/52 |
| 5,745,707 A | * | 4/1998 | Takahashi ..................... 710/110 |
| 5,859,980 A | | 1/1999 | Kalkunte |
| 6,223,266 B1 | * | 4/2001 | Sartore ......................... 711/170 |
| 6,324,595 B1 | * | 11/2001 | Tsai et al. ...................... 710/15 |
| 6,434,645 B1 | * | 8/2002 | Parvin et al. .................. 710/72 |

FOREIGN PATENT DOCUMENTS

WO   WO 94/02900    2/1994

OTHER PUBLICATIONS

European Search Report from priority European patent application No. 00830657, filed Oct. 6, 2000.

* cited by examiner

*Primary Examiner*—Jeffrey Gaffin
*Assistant Examiner*—Mohammad O. Farooq
(74) *Attorney, Agent, or Firm*—Lisa K. Jorgenson; Allen, Dyer, Doppelt, Milbrath & Gilchrist, P.A.

(57) ABSTRACT

Interfacing a microprocessor to a peripheral operating according to high-speed communication specifications (for example, IEEE 1394), includes an interface having a dedicated memory to smooth the delays in communication between the main memory and the peripheral. The dedicated memory has a trigger that is programmable via software to start a communication when a fraction of the memory or the entire memory is full. When a multiple packet starts to be transferred, a signal is generated to alert the microprocessor that a transfer is almost completed.

24 Claims, 1 Drawing Sheet

US 6,763,405 B2

PROCESS FOR INTERFACING A MICROPROCESSOR WITH A PACKET BASED DEVICE AND RESPECTIVE SYSTEM

FIELD OF THE INVENTION

The present invention relates to the interfacing of a microprocessor with a device operating according to packet-based communication criteria. The invention has been developed with particular attention to its potential application to the interfacing of a microprocessor with a Link Layer 1394 device, namely a device operating according to the high-speed communication specifications defined in the IEEE 1394 standard.

BACKGROUND OF THE INVENTION

When a microprocessor is to be connected to a device with high-speed data transmission characteristics (for example, a peripheral unit for real-time audio/video applications), it is current practice to resort to a packet-based communication mechanism. The packets are transmitted in a synchronous way with a clock signal with the aim of maximizing transmission throughput to the peripheral, which operates according to a packet protocol.

There may, however, arise situations (for example, a memory-access stall) that render the packet to be transmitted momentarily unavailable. This results in a de-assertion of the corresponding validation signal, with a consequent transmission delay.

Prior documents, such as US-A-5,842,027, address the problem of interfacing with USB devices. Other documents, such as US-A-5,483,656, US-A-5,752,046 and US-A-6,061,746 generally address the problem of "power management" in a context which, to a certain extent, is akin to that of the present invention. However, none of the above-cited documents deals in a specific way with the problem underlying the present invention.

SUMMARY OF THE INVENTION

An object of the present invention is, then, to achieve interfacing of a microprocessor with one or more high-speed peripherals operating according to a packet protocol in such a way as to maximize transmission throughput and speed in communication.

In accordance with the present invention, the above and other objects are achieved with a process and system which maximizes throughput by minimizing (preferably eliminating) possible gaps or discontinuities that may occur both in data transmission and in data reception within data packets and between sets of successive data packets.

In the currently preferred embodiment, the approach according to the invention provides an interface having a dedicated memory, while the packets are transmitted on the basis of packet size. The dedicated memory "smooths" the delays in the communication between the main memory and the interfacing block proper (for example, a Link Layer Interface (LLI) operating in compliance with the IEEE 1394 standard).

Preferably, this memory has a software-programmable trigger which makes it possible to initiate a communication according to the level of filling of the memory, i.e., when a fraction of the memory or the entire memory is full/empty. In addition, when multiple packets are being transferred, a signal is used for alerting the microprocessor of the fact that a complete transfer is nearly complete.

In a particularly preferred embodiment, the approach according to the invention involves:

- minimizing delays during packet transmission using a dedicated internal memory (preferably organized as a FIFO memory), with recourse to a programmable (via software) signal indicating the state of the internal memory;
- providing read-only "shadow"/registers containing the current address to be transferred, so that the registers that are to be written for the subsequent transfer can be updated before the transfer in progress is through; and
- using an interrupt signal indicating that the transfer is nearly complete, this interrupt can be generated before the transfer is completed, and this enables the next transfer to be programmed before the current transfer is through.

BRIEF DESCRIPTION OF THE DRAWINGS

The invention will now be described, purely by way of non-limiting example, with reference to the annexed drawings, in which:

FIG. 1 illustrates, in the form of a block diagram, the typical scenario of application of the invention;

FIG. 2 presents four superimposed timing diagrams, designated as a, b, c, and d, which indicate patterns in time of some signals that may be generated in the framework of a system according to the invention; and FIG. 3 also includes three superimposed timing diagrams, designated as a, b and c, which represent the patterns of signals generated in the framework of a particularly preferred embodiment of the invention.

DETAILED DESCRIPTION OF THE PREFERRED EMBODIMENTS

In the block diagram of FIG. 1, the reference number 1 designates a microprocessor to which a main memory 2 is associated. The microprocessor 1 is intended to be interfaced with a device or peripheral 3 (of any known type) according to a packet-based protocol. Interfacing is via a peripheral interface 4 preferably organized as a Link Layer Interface (LLI) operating in conformance with the IEEE 1394 standard. This is done in general according to known criteria, which therefore does not need to be recalled in detail herein.

In general, communications between the microprocessor 1 and the peripheral 3 take place, isochronously, on an n-bit parallel channel or port 5. In the embodiment herein illustrated (which is purely an example) it is assumed that the following five signals transit on the channel 5:

- av_data (n input/output bits): audio/video application data;
- av_clk (one output bit): audio/video interface clock;
- av_packet_valid (one input/output bit); indicates that the av_data signal is valid;
- av_packet_start (one input/output bit): sync signal for packet start; and
- av_err (one input bit): indicates that an error is present in the packet.

Transmission of information is based on packets the size of which may be defined by the user.

The above operating modalities emerge even more clearly from the timing diagrams of FIG. 2, which represent typical patterns of the av_clk signal (timing diagram a), av_packet_start signal (timing diagram b), av_packet_valid signal (timing diagram c), and av_data signal (timing diagram d). The instant I indicates the end of a packet in all four timing diagrams. The packets are therefore sent in a synchronous way with respect to the av_clk signal. Consequently, situations may arise (for example, a stall of the access to the memory 2) in which the packet to be sent is momentarily not available, so that the av_packet_valid signal is de-asserted, with consequent delay in communication.

To prevent "gaps" in transmission in the framework of a packet, the approach according to the invention envisages that the interface 4 will have, associated to it and preferably comprised therein, a dedicated memory 40, the function of which is to regularize the delays of the type described above, eliminating their possible negative effects on the communication between the main memory 2 and the interface 3. The dedicated memory 40 is preferably arranged in the form of a FIFO memory and is preferably configured in such a way as to generate two filling-level signals that can be sent back to the microprocessor 1. In particular, the aforesaid filling-level signals (which may also be simply configured as two different states of the same signal) convey the information regarding whether the dedicated memory 40 is full ("fifo full" signal) or empty ("fifo empty" signal).

Before starting transmission, the data are transferred from the main memory 2 to the dedicated memory 40. If the data-transmission speed is high (i.e., operating in high throughput conditions), it is possible to start communication to the peripheral 3 without waiting for the memory 40 to be completely full. Instead, if the data-transfer speed is low (again referring to data transfer between the memory 2 and the dedicated memory 40), it is better to wait for the memory 40 to be completely full before starting transmission to the interface 3.

For this reason, a register 10 may be envisaged (here schematically represented as associated to the interface 4—but it may, of course equally be a register having a different physical location, for instance within the microprocessor 1) which is sensitive to the "fifo full" and "fifo empty" signals described previously (and to the data-transmission speed from the main memory 2 to the dedicated memory 40). All this, with the consequent possibility of beginning data communication starting from the memory 40 to the interface 3 when the memory 40 is completely or only partially full or completely or only partially empty, the degree of filling/emptying that determines the issuing of the corresponding trigger signal being selectively determinable via software through the register 10. The foregoing is performed, operating in a selective way (hence with the consequent possibility of programming from outside) according to the characteristics and performance of the system used.

Another event that is likely to slow down data transmission or reception is illustrated below. When transfer of data organized in a number of packets is started, usually all the packets are sent contiguously (i.e., without any discontinuity). When a given transfer event is completed, the microprocessor 1 is alerted so that it starts a next transfer event. This usually occurs by generating, when transmission is through, an interrupt which the CPU of the microprocessor 1 takes a certain number of clock cycles to handle before starting a new transfer event In this way, a time discontinuity is generated between two consecutive transfer events.

This discontinuity is highlighted specifically in FIG. 3, where the two time intervals in which the av_packet_valid signal assumes the "high" logic level indicate two successive data-packet transfer events or operations separated by a time interval indicated by B. This interval corresponds to the number of clock cycles required for the CPU of the microprocessor 1 to be able to start a subsequent transfer event after the first transfer event is through (the instant being indicated, also in this case, by I).

To overcome the above problem, in the preferred embodiment of the present invention, the interface 4 is configured in such a way as to enable generation and sending to the microprocessor 1 of a transfer-almost-through signal (designated "nearly transfer complete") which identifies the fact that the current transfer event is about to be completed. This approach is adopted by generating two copies of the memory-address location.

This occurs, in particular, when there are available a first register 20, which can be written via software and which contains the starting address of the next data-transfer event starting from the memory 2, and a second (read-only) register 30 containing the current address that is to be accessed by the port 5 during the current transfer event.

Preferably, both of the registers 20 and 30 are located inside the interface 4. The microprocessor 1 has write access only to the register 20 for programming the transfer. The register 30 is managed by the interface 4, which uses it to store the current address. The microprocessor 1 has read-only access to the register 30 for debugging purposes.

Upon start of each new transfer event, this second register 30 (which may be defined as a "shadow" register) is a copy of the first register, but, after the first access to the memory, it increases its value, while the first register 20 is accessible for writing without this fact affecting the current transfer.

The same criterion of use of shadow registers has already been employed to save the number of packets and the number of words to be transferred. In this way, all the registers that contain information for the next transfer may be written before the current transfer is through. In this way, the signal indicating the fact that the transfer is about to be completed can be generated with some advance (typically set at a programmable number of words prior to completion of the current transfer event). In this way, the microprocessor 1 is able to program the next transfer by programming the registers within the interface 40. When the current transfer event is through, the set of registers regarding the next transfer is immediately transferred into the current set, so that the data transfer can restart immediately without there being any substantial discontinuity.

In addition, since two "motors" are used, one for accessing the memory and the other for the port of the peripheral, thanks to the availability of the "fifo empty" signal (which, as has been seen, may be generated even when the internal memory is only partially empty, hence not necessarily when it is completely empty), access to the memory may start before transfer of the last packet of the preceding block is completed, so eliminating any delay. Consequently, after a possible slight latency at the start of the first packet of the first transfer, the solution according to the invention enables reduction and virtual elimination of the delays that occur within a packet and between one packet and the next by using the dedicated memory 40 and the corresponding signal indicating the filling state thereof.

In the currently preferred embodiment, the solution according to the invention moreover enables minimization and virtual elimination of the delays between two successive transfers of different sets of packets. This is obtained, on the one hand, by reducing the time for handling of the interrupt by the CPU of the microprocessor 1 via the shadow-register mechanism just described, and, on the other hand, via the generation of the "nearly transfer complete" signal. Of course, also the latency associated to the first packet of the next transfer benefits from the presence of the dedicated memory 40.

Without prejudice to the principle of the invention, the details of construction and the embodiments may be widely varied with respect to what is described and illustrated herein, without thereby departing from the scope of the present invention as defined in the attached claims.

The invention claimed is:

1. A process for interfacing a microprocessor with a device, the process being based upon transfer of data packets from a main memory to the device via an interface, the process comprising:

associating to said interface a dedicated memory for accumulating the data coming from said main memory in view of their transfer to said device;

generating at least one filling signal which indicates the state of filling of said dedicated memory;

controlling transfer of the data packets from said dedicated memory to said device according to said at least one filling signal;

generating a transfer-almost-through signal indicating that a current transfer event is about to be completed; and sending said transfer-almost-through signal to the microprocessor to enable its configuration in view of a next transfer event which is started upon completion of said current transfer event without any substantial discontinuity.

2. A process according to claim 1, comprising incorporating said dedicated memory in said interface.

3. A process according to claim 1 comprising organizing said dedicated memory as a FIFO memory.

4. A process according to claim 1, comprising activating the transfer of said data to said device in a selectively variable way according to said filling signal, namely according to whether said dedicated memory is completely or partially full and completely or partially empty, respectively.

5. A process according to claim 1, comprising:

providing a first memory element;

recording in said first memory element the start address of said next transfer event;

providing a second memory element;

recording in said second memory element the current memory address being transferred in the framework of said current transfer event; and upon completion of said current transfer event, transferring the contents of said first memory element into said second memory element, starting said next transfer event in the substantial absence of any discontinuity with respect to said current transfer event.

6. A process according to claim 1, wherein said interface is organized in conformance with the IEEE 1394 standard.

7. An interface system for interfacing a microprocessor with a device, the interface system being able to transfer data packets from a main memory to said device, the interface system comprising:

a dedicated memory for accumulating the data coming from said main memory and being transferred to said device;

said dedicated memory being configured to generate at least one signal indicating the state of filling of the dedicated memory; and an interface for transferring data packets from said dedicated memory to said device according to said at least one filling signal, generating a transfer-almost-through signal indicating that a current transfer event is about to be completed, and sending said transfer-almost-through signal to said microprocessor, said next transfer event being started upon completion of said current transfer event without any substantial discontinuity.

8. A system according to claim 7, wherein said dedicated memory is incorporated in said interface.

9. A system according to claim 7, wherein said dedicated memory is organized as a FIFO memory.

10. A system according to claim 7, comprising a processing element which is selectively programmable for selectively activating transfer of said data to said device based upon whether said dedicated memory is completely or partially full and completely or partially empty, respectively.

11. A system according to claim 7, comprising:

a first memory element for recording the address of start of said next transfer event;

a second memory element for recording the current memory address being transferred in the framework of said current transfer event; the contents of said first memory element being transferable to said second memory element upon completion of said current transfer event, whereby said next transfer event is able to be started in the substantial absence of discontinuities with respect to said current transfer event.

12. A system according to claim 7, wherein said interface is organized according to the IEEE 1394 standard.

13. A method to interface a microprocessor with a device, the microprocessor having a main memory, the method comprising:

providing an interface with an associated dedicated memory to store data being transferred from said main memory to said device;

controlling transfer of the data from said dedicated memory to said device according to at least one status signal which indicates a fullness state of said dedicated memory; and sending a transfer-almost-through signal indicating that a current transfer is about to be completed to the microprocessor before a next transfer event which is started upon completion of said current transfer event.

14. A method according to claim 13, further comprising incorporating said dedicated memory in said interface.

15. A method according to claim 13, wherein said dedicated memory comprises a FIFO memory.

16. A method according to claim 13, further comprising selectively activating the transfer of said data to said device based upon the status signal, the status signal indicating whether said dedicated memory is completely or partially full and completely or partially empty, respectively.

17. A method according to claim 13, further comprising:

providing a first memory element;

recording the start address of the next transfer event in said first memory element;

providing a second memory element;

recording the current memory address of the current transfer event in said second memory element; and upon completion of said current transfer event, transferring the start address stored in said first memory element into said second memory element, and starting the next transfer event without any substantial discontinuity.

18. A method according to claim 13, wherein said interface meets the IEEE 1394 standard.

19. An interface system for interfacing a microprocessor with a device, the microprocessor having an associated main memory, the system comprising:

a dedicated memory for storing data transferred from said main memory to said device, and generating at least one status signal indicating a fullness state of the dedicated memory; and an interface for transferring data from said dedicated memory to said device according to said at least one status signal, and sending a transfer-almost-through signal indicating that a current transfer event is about to be completed to said microprocessor, wherein said next transfer event is started upon completion of said current transfer event.

20. A system according to claim 19, wherein said dedicated memory is incorporated in said interface.

21. A system according to claim 19, wherein said dedicated memory comprises a FIFO memory.

22. A system according to claim 19, further comprising a processing element which is selectively programmable for activating transfer of said data to said device based upon the status signal, the status signal respectively indicating whether said dedicated memory is completely or partially full and completely or partially empty.

23. A system according to claim 19, further comprising:

a first memory element for storing a start address of the next transfer event; and a second memory element for storing the current memory address of the current transfer event;

the start address stored in said first memory element being transferable to said second memory element upon completion of said current transfer event, whereby said next transfer event is started without any substantial discontinuity.

24. A system according to claim 19, wherein said interface conforms to the IEEE 1394 standard.

* * * * *